United States Patent [19]

Hotta

[11] Patent Number: 4,774,708

[45] Date of Patent: Sep. 27, 1988

[54] STATION OF A TDMA COMMUNICATION NETWORK CAPABLE OF QUICKLY CHANGING COMMUNICATION TRAFFIC WITHOUT CAUSING AN OVERLAP BETWEEN TRANSMISSION BURSTS

[75] Inventor: Toshinori Hotta, Tokyo, Japan

[73] Assignee: NEC Corporation, Japan

[21] Appl. No.: 945,040

[22] Filed: Dec. 22, 1986

[30] Foreign Application Priority Data

Dec. 23, 1985 [JP] Japan .................. 60-289830

[51] Int. Cl.$^4$ ............................................. H01J 3/06
[52] U.S. Cl. .................................... 370/104; 370/95
[58] Field of Search ....................... 370/104, 95

[56] References Cited

U.S. PATENT DOCUMENTS

| Re. 28,577 | 10/1975 | Schmidt | 370/95 |
|---|---|---|---|
| 3,922,496 | 11/1975 | Gabbard et al. | 370/104 |
| 4,398,291 | 8/1983 | Hotta et al. | 370/104 |
| 4,495,619 | 1/1985 | Acampora | 370/104 |
| 4,513,416 | 4/1985 | Fujiwara | 370/104 |
| 4,561,099 | 12/1985 | Atsugi et al. | 370/104 |
| 4,574,378 | 3/1986 | Kobayashi | 370/104 |
| 4,606,019 | 8/1986 | Takai | 370/104 |
| 4,688,216 | 8/1987 | Saburi | 370/104 |
| 4,688,217 | 8/1987 | Ishi et al. | 370/104 |
| 4,689,787 | 8/1987 | Hotta | 370/104 |

Primary Examiner—Salvatore Cangialosi
Attorney, Agent, or Firm—Laff, Whitesel, Conte & Saret

[57] ABSTRACT

In a terrestrial station of a TDMA communication network, a TDMA frame includes a particular time slot shared by the station and other stations of the network. In order to increase communication traffic, each station can send a transmission burst in the particular time slot in addition to a preassigned time slot which is preassigned to the station. In response to a reception burst received through a prescribed time slot, the station determines whether or not it can send the transmission burst to the particular time slot. This makes it possible to change the communication traffic without causing overlap of bursts in the particular time slot.

2 Claims, 2 Drawing Sheets

STATION OF A TDMA COMMUNICATION NETWORK CAPABLE OF QUICKLY CHANGING COMMUNICATION TRAFFIC WITHOUT CAUSING AN OVERLAP BETWEEN TRANSMISSION BURSTS

BACKGROUND OF THE INVENTION

This invention relates to a station which is included in a time division multiple access (often abbreviated to TDMA) communication network, such as a TDMA satellite communication network.

A conventional TDMA communication network comprises a plurality of stations each of which is communicable with one another through an up-link and a down-link frame. The up-link and the down-link frames include a plurality of up-link time slots and a plurality of down-link time slots. For carrying out communication, each of the stations sends a transmission burst in a preassigned one of the up-link time slots. Thus, the transmission burst is transmitted to one or more of other stations which are collectively called a first one of the other stations. In addition, each of the stations can receive a reception burst in a prescribed one of the down-link time slots. The reception burst is transmitted from one or more of the other stations which are collectively called a second one of the other station.

In Japanese Prepublication (Kôkai or Publication of Unexamined Patent Application) No. 10,544 of 1982 for an invention by the present applicant, a time division multiple access satellite communication network is disclosed which comprises a preselected one of a plurality of earth stations as a control station. In this prepublication, each of the earth stations has a communication time interval which is assigned by the control station. The communication time interval is decided with reference to a communication traffic which is predicted in each of the earth stations. The communication time interval can be changed by the control station in response to requirements of each earth station. In other words, the control station collectively controls the communication time intervals of the earth stations.

However, it is a problem in this network that a change of the communication time interval requires a long time, for example, at least several tens of seconds. Therefore, operation is slow in relation to the change of the communication time interval. This is because communication must be carried out between the control station and each of the other stations. In addition, it is necessary to avoid overlap of transmission bursts on one another after the communication time interval is changed.

SUMMARY OF THE INVENTION

It is therefore an object of the present invention to provide a station included in a TDMA communication network, which is capable of quickly changing communication traffic.

It is another object of this invention to provide a station of the type described, which is capable of changing communication traffic without causing overlap of a transmission burst of the station on other transmission bursts transmitted from other stations.

Other objects of this invention will become clear as the description proceeds.

According to this invention, there is provided a terrestrial station of a time division multiple access communication network. The terrestrial station includes transmission means for transmitting a transmission burst in a preassigned time slot of each up-link frame to a first one of other stations of the time division multiple access communication network and reception means for receiving a reception burst in a prescribed time slot of each down-link frame from a second one of the other stations. The up-link and the down-link frames include a particular up-link time slot and a particular down-link time slot, respectively. The particular up-link and the particular down-link time slots is shared by the terrestrial station and the other stations for transmission of a data signal between at least two of the terrestrial station and the other stations. In this event, the terrestrial station comprises first detecting means coupled to the reception means for detecting the particular down-link time slot to produce a first detection signal upon detection of the particular down-link time slot, second detecting means coupled to the reception means and responsive to the first detection signal for detecting whether or not the particular down-link time slot carries the data signal, the second detecting means producing a second detection signal upon detection of the last-mentioned data signal. The terrestrial station further comprises time slot signal producing means responsive to the first detection signal for producing a time slot signal indicative of the particular up-link time slot in each up-link frame, and allowing means coupled to the transmission means, the second detection means, and the time slot signal producing means for allowing the transmission means to start transmission of a data signal to the first one of the other stations as an addition to the transmission burst in the particular up-link time slot indicated by the time slot signal only when the second detecting means does not produce the second detection signal.

DESCRIPTION OF THE PREFERRED EMBODIMENTS

Figure 1:
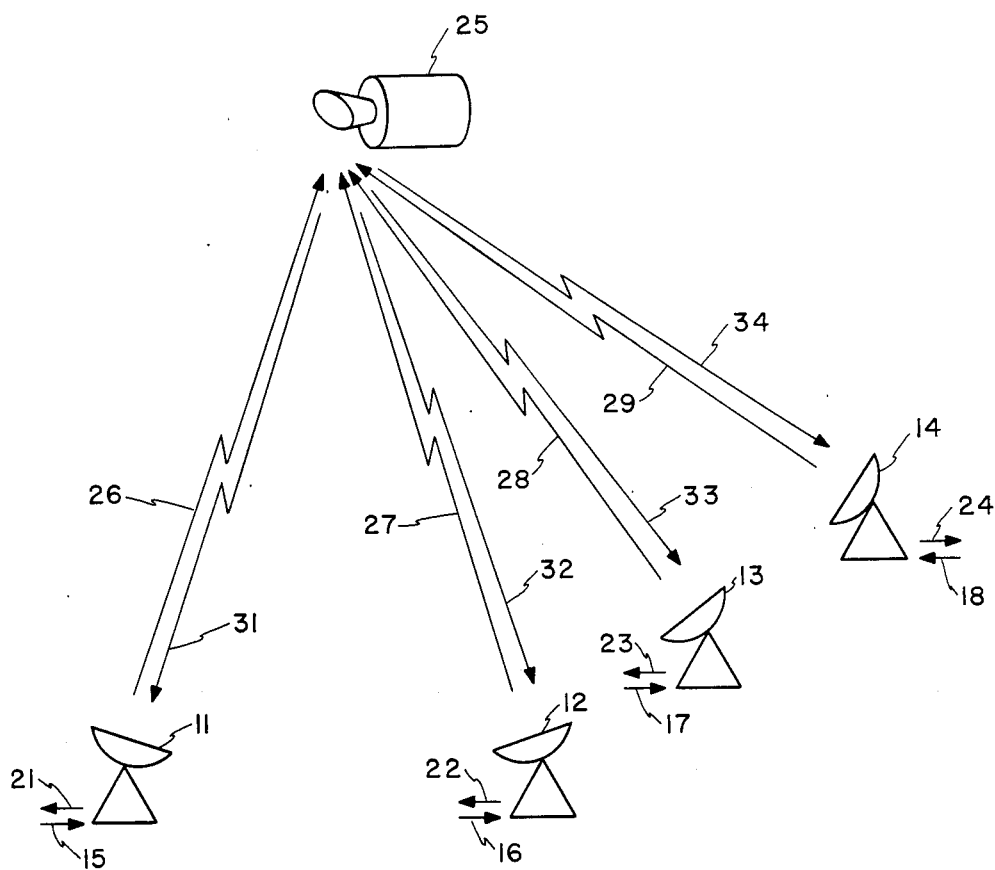
FIG. 1 is a block diagram of a TDMA satellite communication network including a plurality of terrestrial stations each of which has a structure according to an embodiment of this invention.

Referring to FIG. 1, a TDMA satellite communication network comprises a plurality of terrestrial or earth stations 11 through 14 which are connected to terminal stations (not shown) through transmission lines 15 to 18 and through reception lines 21 to 24. The terminal stations are for sending transmission signals to the terrestrial stations 11 to 14 through the transmission lines 15 to 18 and for receiving reception signals from the terrestrial stations 11 to 14 through the reception lines 21 to 24.

The terrestrial stations 11 to 14 are for transmitting transmission bursts to a satellite 25 through a plurality of transmission channels 26 to 29. The satellite 25 sends the transmission bursts to the terrestrial stations 11 to 14 as reception bursts through reception channels 31 to 34. The transmission and the reception bursts are for carrying data signals.

Figure 2:
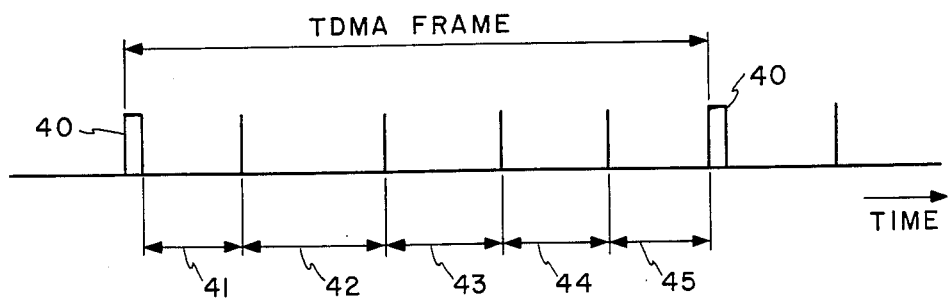
FIG. 2 is a time chart for use in describing operation of the TDMA communication network illustrated in FIG. 1.

Referring to FIG. 2 afresh and FIG. 1 again, principles of the TDMA communication network will be described. For convenience of description, a preselected one of the terrestrial stations 11 through 14 will often be called a reference earth station. In FIG. 2, the reference earth station is for periodically generating standard or reference bursts 40. Each of the reference bursts 40 specifies a TDMA frame which will be called an up-link frame and a down-link frame when the TDMA frame is transmitted to and received from the satellite, respectively.

The TDMA frame consists of each reference burst 40 and a remaining part. The remaining part comprises a plurality of ordinary time slots 41 through 44 and a particular time slot 45. The ordinary time slots 41 through 44 are preassigned to the respective terrestrial stations 11 through 14 in the up-link frame and may be referred to as preassigned time slots of the up-link frame. In the down-link frame, the time slots 41 through 44 are predetermined for the respective terrestrial stations 11 through 14 and may be referred to as prescribed time slots of the down-link frame so as to be distinguished from the preassigned time slots in the up-link frame. The transmission burst is sent in the preassigned time slot and appears in the prescribed time slot as the reception burst.

The particular time slot 45 is referred to as a particular up-link time slot in the up-link frame. In the down-link frame, the particular time slot 45 is referred to as a particular down-link time slot. The particular up-link and the particular down-link time slots are shared by the terrestrial stations 11 through 14. Therefore, each transmission burst of the terrestrial stations 11 through 14 is transmitted through the particular up-link time slot in a manner to be described later so that the transmission burst does not overlap with each other in the particular up-link time slot. The transmission bursts then appear in the particular down-link time slot as the reception bursts through the satellite 25.

Description will hereafter be made in relation to only one of the terrestrial stations 11 through 14 which is depicted in FIG. 1 by a reference numeral 11. It is to be noted that the terrestrial station 11 is not the reference earth station. For convenience of description, others of the terrestrial stations 11 through 14 are called other stations.

Figure 3:
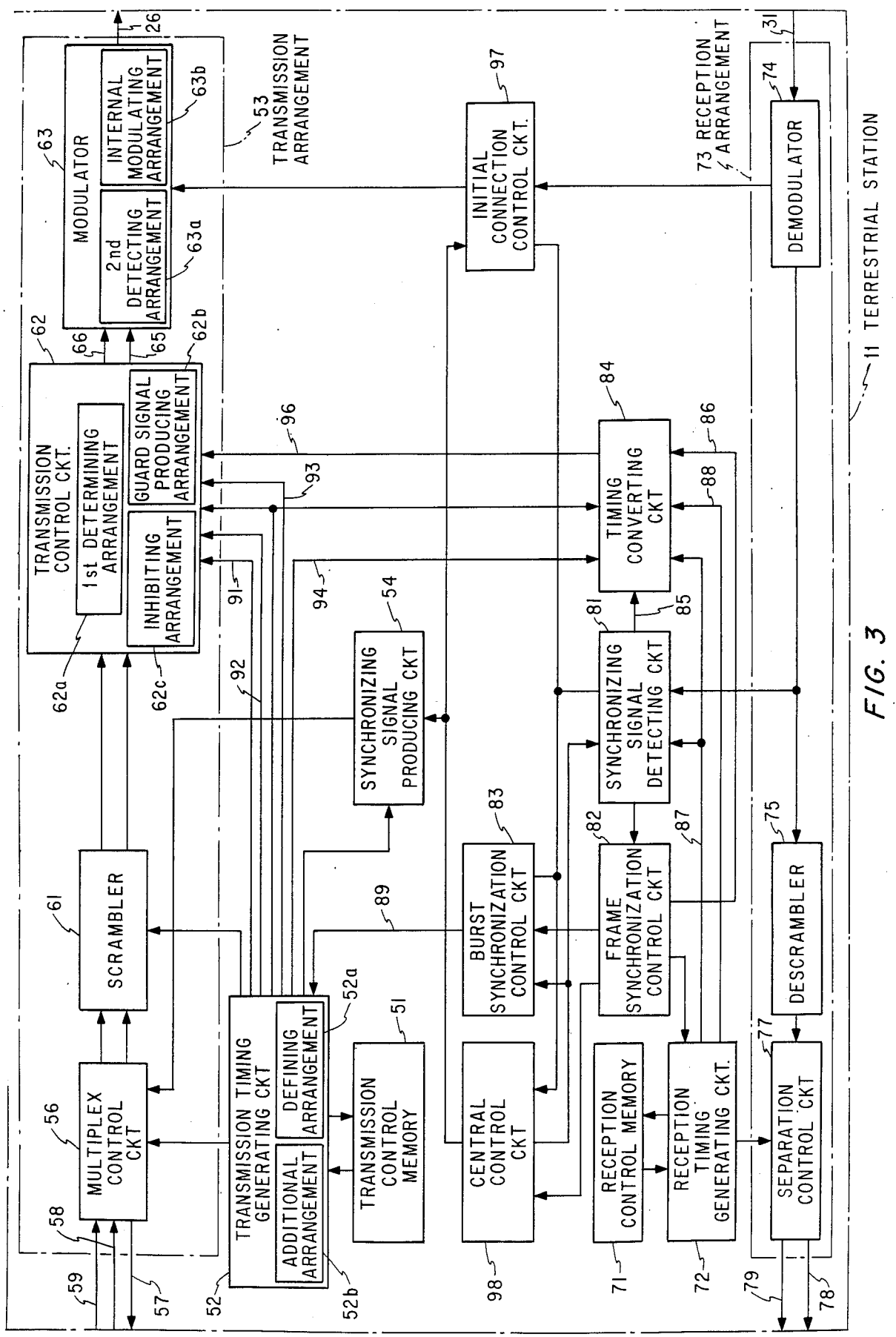
FIG. 3 is a block diagram of each terrestrial station illustrated in FIG. 1.

Referring to FIG. 3, the terrestrial station 11 includes a transmission control memory 51, a transmission timing generating circuit 52, a transmission arrangement 53, and a synchronizing signal producing circuit 54. The transmission control memory 51 is for memorizing transmission burst information necessary for transmitting the transmission burst. The transmission timing generating circuit 52 is for periodically producing a transmission timing signal referring to the reference burst 40 and the transmission information. The transmission timing signal is supplied to the transmission control memory 51. The transmission timing signal has a timing relative to the reference bursts 40 as will later becomes clear.

The transmission arrangement 53 is for transmitting the transmission burst to the transmission channel 26 and includes a multiplex control circuit 56. The multiplex control circuit 56 is responsive to the transmission timing signal for producing a terminal control signal which is sent to the terminal stations of the terrestrial station 11 through a first output line 57.

The above-mentioned transmission signal includes a first and a second input signal. The first and the second input signals are supplied to the multiplex control circuit 56 through first and second lines 58 and 59, respectively. The first input signal is representative of transmission data. The second input signal is represented by one of logic "1" and "0" levels at a time. When transmission is required, the second input signal becomes the logic "1" level. Otherwise, the second input signal is given the logic "0" level.

The synchronizing signal generating circuit 54 is responsive to the transmission timing signal and is for producing a synchronizing signal. The synchronizing signal is supplied to the multiplex control circuit 56.

The multiplex control circuit 56 combines the first and the second input signals with the synchronizing signal to produce a first and a second combined signal. The first and the second combined signals are supplied to a scrambler 61. The scrambler 61 carries out predetermined scrambling operation of the first and the second combined signals referring to the transmission timing signal to produce a first and a second local input signal. The first and the second local input signals are supplied to a transmission control circuit 62 and are controlled therein as will later become clear.

The transmission control circuit 62 sends a first and a second controlled signal to a modulator 63 through first and second local lines 65 and 66. The first controlled signal is representative of the transmission data. The second controlled signal is represented by one of logic "1" and "0" levels at a time. When the transmission is required, the second controlled signal becomes the logic "1" level. Otherwise, the second controlled signal becomes the logic "1" level. Otherwise, the second controlled signal is given the logic "0" level. The first controlled signal is modulated into the transmission burst in the modulator 63. Only when the second controlled signal has the logic "1" level, the transmission burst is sent to the transmission channel 26 as the data signal.

The terrestrial station 11 further comprises a reception control memory 71, a reception timing generating circuit 72, and a reception arrangement 73. The reception control memory 71 is for memorizing reception burst information necessary for receiving the reception burst. The reception timing generating circuit 72 is for periodically producing a reception timing signal referring to the reception line connection information. The reception timing signal is supplied to the reception control memory 71. The reception timing signal has a timing relative to the reference bursts 40 as will later become clear.

The reception arrangement 73 is for receiving the reception burst which is sent through the reception channel 31. The reception arrangement 73 thereby detects the data signal carried by the reception bursts. The reception arrangement includes a demodulator 74 which is for demodulating the reception burst to produce a demodulated signal. The demodulated signal is supplied to a descrambler 75.

The descrambler 75 is carried out inversion of the predetermined scrambling operation of the demodulated signal to produce a descrambled signal. The descrambled signal is supplied to a separation control circuit 77. The separation control circuit 77 is responsive to the reception timing signal and is for separating the descrambled signal into an additional control signal and a reception data signal. The additional control signal is for designating one or more of the terminal stations. The reception data signal is representative of reception data.

The additional control and the reception data signals are sent to second and third output lines 78 and 79, respectively.

The demodulated signal includes a succession of reference synchronizing signals and a succession of burst synchronizing signals. The reference synchronizing signal succession is produced in relation to the reference earth station. The burst synchronizing signal succession is produced in relation to the terrestrial stations 11 through 14. The reference and the burst synchronizing signal successions are collectively called the synchronizing signal.

The terrestrial station 11 further comprises a synchronizing signal detecting circuit 81, a frame synchronization control circuit 82, a burst synchronization control circuit 83, and a timing converting circuit 84.

Supplied with the demodulated signal from the demodulator 74, the synchronizing signal detecting circuit 81 detects the synchronizing signal in the demodulated signal to produce a synchronizing signal detection signal. The synchronizing signal detection signal includes a first detection signal which is produced upon detection of the particular down-link time slot. Therefore, the synchronizing signal detecting circuit 81 is referred to as a first detecting arrangement. The synchronizing signal detection signal is sent to the timing converting circuit 84 through a line 85.

In cooperation with the synchronizing signal detecting circuit 81, the frame synchronization control circuit 82 establishes reception timing. The burst synchronization control circuit 83 determines burst synchronization. The reception timing and the burst synchronization are used in controlling transmission timing of the transmission burst so as to avoid overlap between the transmission bursts in the up-link frame.

The frame synchronization control circuit 82 produces a frame synchronization condition signal when the reception timing is established. More particularly, only when the frame synchronization control circuit 82 periodically receives the synchronizing signal detection signal which is dependent on the reference synchronizing signal, the frame synchronization condition signal becomes a logic "1" level. Otherwise, the frame synchronization signal is given the logic "0" level. The frame synchronizing signal is supplied to the timing converting circuit 84 through a line 86.

The reception timing circuit 72 is coupled to the frame synchronization control circuit to produce a reception frame pulse and a synchronizing signal detection aperture signal. The reception frame pulse is supplied to each of the synchronizing signal detecting circuit 81 and the timing converting circuit 83 through a line 87. The synchronizing signal detection aperture signal is supplied to only the timing converting circuit 83 through a line 88.

A local control signal is supplied from the burst synchronization control circuit 83 to the transmission timing generating circuit 52 through a line 89. The local control signal is dependent on the synchronizing signal detection signal and includes the first detection signal.

The transmission timing generating circuit 52 carries out a predetermined calculation referring to the local control signal and the transmission line connection information to produce a preassigned time slot, a particular time slot, a burst address, and a transmission frame signal in addition to the transmission timing signal. The preassigned time slot, the particular time slot, and the burst address signals are supplied to the transmission control circuit 62 through lines 91, 92, and 93, respectively. The transmission frame signal is supplied to the timing converting circuit 84 through a line 94 and is for determining each up-link frame. The transmission timing signal is also supplied to each of the transmission control circuit 62 and the timing converting circuit 84 through a line 95 and is for determining a transmitting reference timing.

More particularly, the transmission timing generating circuit 52 includes a defining arrangement 52a and an additional arrangement 52b. The defining arrangement 52a is coupled to the line 89 to define the particular up-link time slot in each up-link frame in response to the first detection signal. The additional arrangement 52b is coupled to the defining arrangement 52a to produce the particular time slot signal which is indicative of the particular up-link time slot. In this manner, a combination of the defining arrangement 52a and the additional arrangement 52b is referred to as a time slot signal producing arrangement.

The preassigned time slot signal becomes a logic "1" level at a timing which corresponds to the preassigned time slot 41 of the up-link frame. Otherwise, the preassigned time slot signal is given the logic "0" level. The particular time slot signal becomes a logic "1" level at a timing which corresponds to the particular up-link time slot 45. Otherwise, the particular time slot signal is given the logic "0" level.

Only when the preassigned time slot signal has the logic "1" level, the transmission arrangement 53 transmits the transmission burst through the transmission channel 26 in the manner known in the art.

The timing converting circuit 84 is coupled to the reception timing producing circuit 72 and is responsive to the frame synchronization condition signal, the reception frame pulse, the synchronizing signal detection aperture signal, the transmission frame pulse, and the transmission timing signals for converting the synchronizing signal detection signal into a processed local signal which is timed relative to the up-link frame. Only when the synchronizing signal detection signal is supplied to the timing converting circuit 84, the processed local signal has a logic "1" level. Otherwise, the processed local signal is given the logic "0" level. The processed local signal is supplied to the transmission control circuit 62 through a line 96.

In this event, the processed local signal includes a second detection signal which is produced in response to the first detection signal and is representative of whether or not the particular down-link time slot carries the data signal. Therefore, a combination of the reception timing producing circuit 72 and the timing converting circuit 84 is referred to as a second detecting arrangement.

The transmission control circuit 62 comprises a first determining arrangement 62a. The modulator 62 comprises a second determining arrangement 63a and an internal modulating arrangement 63b. The first determining arrangement 62a is coupled to the scrambler 61 and the lines 91 and 96 and is responsive to the particular time slot signal, the second detection signal, and the second local input signal for determining whether or not the second controlled signal has the logic "1" level. The second determining arrangement 63a is coupled to the lines 65 and 66 and is responsive to the second controlled signal for determining whether or not the first controlled signal is sent to the internal modulating arrangement 63b. The internal modulating arrangement 63b is coupled to the second determining arrangement 63a and for modulating the first controlled signal into the transmission burst.

Description will hereafter be made in relation to a time instant at which the particular time slot signal has the logic "1" level. When the second detection signal has the logic "0" level, the first determining arrangement 62a allows the second controlled signal to become the logic "1" level in response to the second local input signal. Otherwise, the first determining arrangement 62a makes the second controlled signal be given the logic "0" level. Only when the second controlled signal has the logic "1" level, the first controlled signal is sent to the internal modulating arrangement 63b and modulated therein into the transmission burst.

Therefore, the transmission burst of the terrestrial station 11 does not overlap on other transmission burst transmitted from the other stations 12 to 14.

In this event, a combination of the first and the second determining arrangements 62a and 63a serves to allow the transmission arrangement 53 to send the transmission burst in the particular up-link time slot 45 and may therefore be referred to as an allowing arrangement.

After the transmission burst is sent to the particular up-link time slot, the second detection signal becomes the logic "1" level. This is because the reception arrangement 73 receives the reception burst which is carried by the particular down-link time slot and dependent on the last-mentioned transmission burst.

However, the first defining arrangement 62a maintains the logic "1" level of the second controlled signal even if the second detection signal becomes the logic "1" level after the transmission burst is transmitted to the transmission channel 26. Therefore, no transmission operation is interrupted after it is started.

When the transmission operation is simultaneously carried out in the terrestrial station 11 and the other stations 12 to 14, the transmission bursts may overlap on one another in the particular up-link and the particular down-link time slots. Description will hereafter be made in relation to avoiding of such overlap of the transmission burst.

The transmission control circuit 62 further comprises a guard signal producing arrangement 62b and an inhibiting arrangement 62c. The guard signal producing arrangement 62b is coupled to the first determining arrangement 62a to produce a guard signal. The second controlled signal is also supplied to the guard signal producing arrangement 62b. After the second controlled signal becomes the logic "1" level, the guard signal is produced from the guard signal producing arrangement 62b after lapse of a predetermined time interval of, for example, 0.3 seconds. The guard signal is sent to the inhibiting arrangement 62c.

The inhibiting arrangement 62c is coupled to the line 96, the first determining arrangement 62a, and the guard signal producing arrangement 62b for inhibiting transmission of the transmission burst in the particular up-link time slot. The second detection signal is also supplied to the inhibiting arrangement 62c.

When the transmission burst overlaps on other transmission bursts transmitted from the other stations 12 to 14, the second detection signal becomes the logic "0" level. If the second detection signal is given the logic "0" level after the inhibiting arrangement 62c receives the guard signal, the inhibiting arrangement 62c produces an inhibiting signal. When the inhibiting signal is supplied to the first determining arrangement 62a, the second controlled signal becomes the logic "0" level. As a result, the transmission arrangement 53 stops the transmission of the transmission burst.

The terrestrial station 11 further comprises an initial connection control circuit 97 and a central control circuit 98. The initial connection control circuit 97 is coupled to the modulator 63 and the demodulator 74 and is for controlling the modulator 63 to establish an initial timing at which the transmission operation is started. The central control circuit 98 is for controlling the synchronizing signal producing, the synchronizing signal detecting, the burst synchronization control, and the initial connection control circuits 54, 81, 83, and 97.

It is a matter of course that each of the other stations 12 through 14 has a construction which is similar to the terrestrial station 11.

According to the TDMA satellite communication network including the terrestrial stations 11 through 14 thus far described, it is possible to quickly change communication traffic in each terrestrial station.. This is because whichever one of the terrestrial stations 11 through 14 can send its transmission burst through its preassigned time slot and moreover through the particular up-link time slot provided that the particular down-link time slot is not used in communication between at least two of the other stations.

While the present invention has thus far been described in conjunction with the terrestrial station of the TDMA satellite communication network, it will now readily be applicable to each station of a communication network of the other kind. In addition, the guard signal producing arrangement 62b may be coupled to the modulator 63 to produce the guard signal in response to a signal which is sent from the modulator 63.

What is claimed is:

1. In a terrestrial station of a time division multiple access communication network, said terrestrial station including transmission means for transmitting a transmission burst in a preassigned time slot of each up-link frame to a first one of other stations of said time division multiple access communication network and reception means for receiving a reception burst in a prescribed time slot of each down-link frame from a second one of said other stations, the improvement wherein:

said up-link and said down-link frames include a particular up-link time slot and a particular down-link time slot, respectively, said particular up-link and said particular down-link time slots being shared by said terrestrial station and said other stations for transmission of a data signal between at least two of said terrestrial station and said other stations;

said terrestrial station comprising:

first detecting means coupled to said reception means for detecting said particular down-link time slot to produce a first detection signal upon detection of said particular down-link time slot;

second detecting means coupled to said reception means and responsive to said first detection signal for detecting whether or not the particular down-link time slot carries the data signal, said second detecting means producing a second detection signal upon detection of the last-mentioned data signal;

time slot signal producing means responsive to said first detection signal for producing a time slot signal indicative of the particular up-link time slot in each up-link frame; and allowing means coupled to said transmission means, said second detection means, and said time slot signal producing means for allowing said transmission means to start transmission of a data signal to said first one of the other stations as an addition to said transmission burst in the particular up-link time slot indicated by said time slot signal only when said second detecting means does not produce said second detection signal.

2. A terrestrial station claimed in claim 1, further comprising:

guard signal producing means coupled to said time slot signal producing means for producing a guard signal a predetermined time interval after the transmission of the data signal is started in the particular up-link time slot indicated by said time slot signal;

inhibiting means coupled to said guard signal producing means, said second detecting means, and said allowing means for inhibiting transmission of the data signal in the particular up-link time slot indicated by said time slot signal when said second detection signal is not produced after production of said guard signal.

* * * * *